United States Patent [19]

Crist

[11] 4,183,008
[45] Jan. 8, 1980

[54] NOISE MAKING DEVICE
[75] Inventor: Ralph P. Crist, Harrisburg, Pa.
[73] Assignee: The United States of America as represented by the Secretary of the Navy, Washington, D.C.
[21] Appl. No.: 144,513
[22] Filed: Oct. 11, 1961

Related U.S. Application Data
[62] Division of Ser. No. 734,803, May 12, 1958.
[51] Int. Cl.² .................................... H04B 11/00
[52] U.S. Cl. ................................ 367/142; 116/27; 367/1
[58] Field of Search ........... 116/26, 27, 137, 143, 116/146, 144, 137 A, 137 R; 102/54; 181/0.51, 0.59, 0.5; 340/5, 5 D, 12

[56] References Cited
U.S. PATENT DOCUMENTS

| | | | |
|---|---|---|---|
| 1,109,811 | 9/1914 | Wood | 116/27 |
| 2,395,862 | 3/1946 | Freeman et al. | 116/27 |
| 2,548,905 | 4/1951 | Odenweller et al. | 116/27 |
| 2,710,458 | 6/1955 | Reed | 340/3 |
| 2,981,927 | 4/1961 | McKenney | 340/2 |

*Primary Examiner*—Richard A. Farley
*Attorney, Agent, or Firm*—R. S. Sciascia; Q. E. Hodges

EXEMPLARY CLAIM

4. An underwater noise generator comprising a thick-walled hollow cylindrical housing, said housing having continuous inner and outer cylindrical surfaces and at least one hollow portion between said inner and outer surfaces; a spindle rotatably mounted within said housing along the longitudinal axis thereof, means for rotating said spindle, and a roller mounted on said spindle and driven thereby in rolling contact with said inner surface of said housing, said roller having a plurality of grooves cut in the exterior surface thereof, whereby sound is produced as said rollers roll on said cylindrical housing.

4 Claims, 5 Drawing Figures

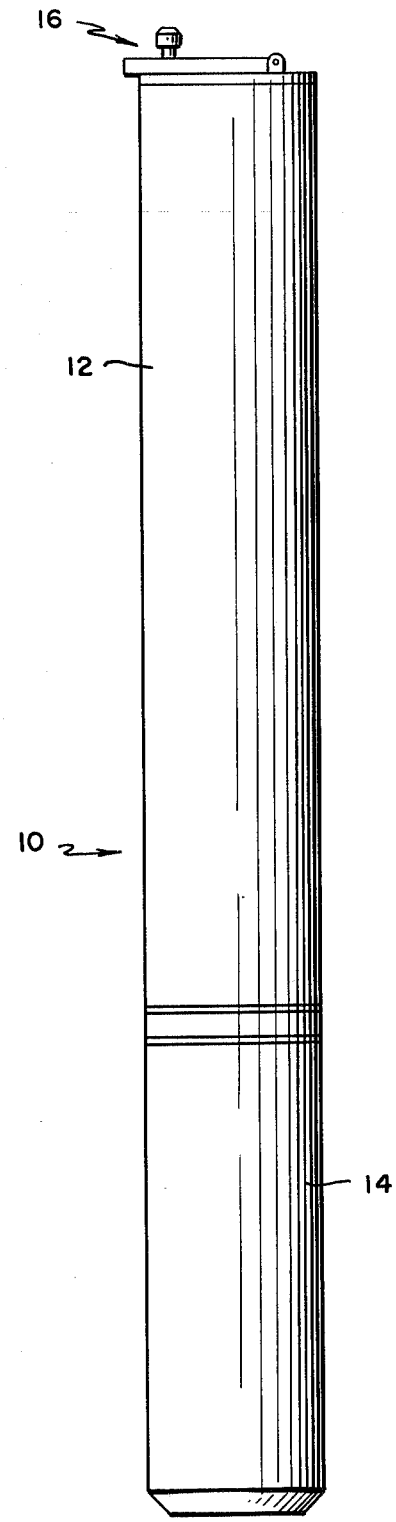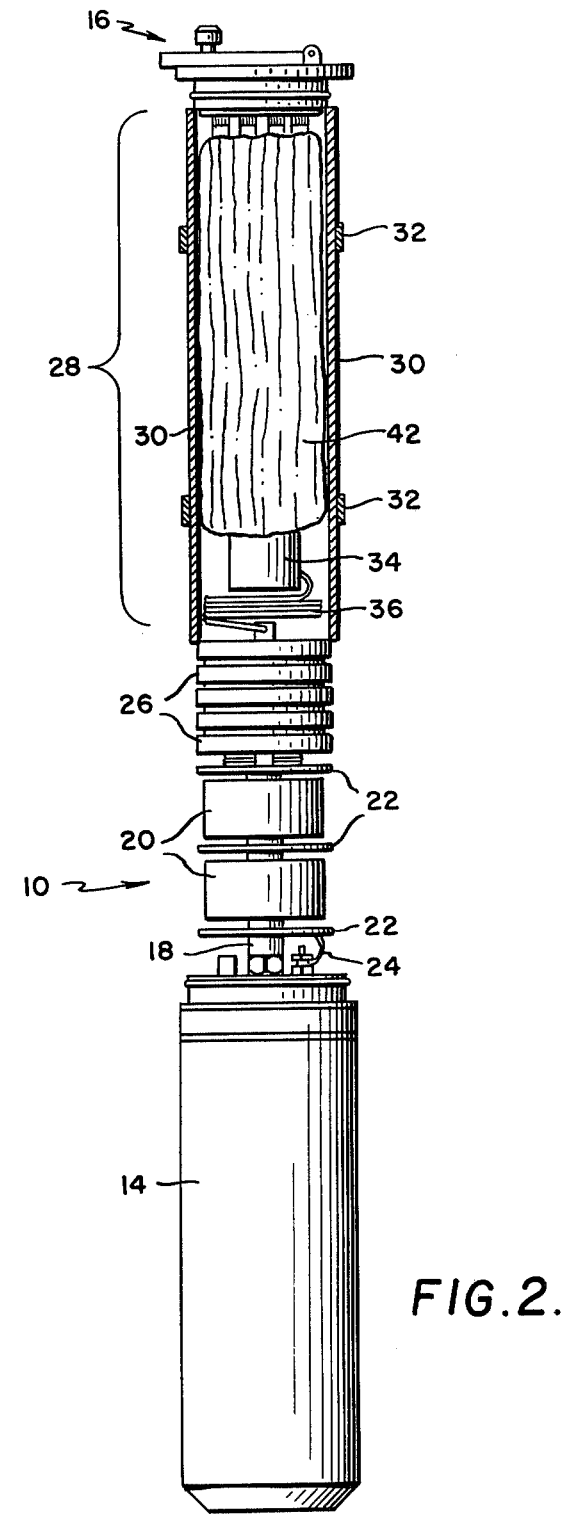
FIG. 1.
FIG. 2.

NOISE MAKING DEVICE

The invention described herein may be manufactured and used by or for the Government of the United States of America for governmental purposes without the payment of any royalties thereon or therefor.

This application is a division of application Ser. No. 734,803, filed May 12, 1958, for Noisemaker Beacon.

The present invention relates to underwater acoustical sources and more particularly to noisemaking devices for producing random noise as a countermeasure for submarine detection systems.

The beacon comprises a noisemaker which generates a wide band, high intensity, random noise which is supported in the water by a flotation device generally consisting of a balloon inflated by a gas generator. The flotation device is folded, placed in a casing, and stored in a submarine. When under attack by an enemy ship having a hydrophone or sonar equipment, the submarine launches the beacon and tries to escape without being detected by the hydrophone or sonar.

Prior art noisemaking devices for this purpose have been incapable of producing a sufficient acoustic output from the noisemaker in the frequency range above 20 kilocycles per second.

An object of this invention, therefore, is to provide a noisemaker having an improved acoustic output above 20 kilocycles.

Other objects and advantages of the invention will hereinafter become more fully apparent from the following description of the annexed drawings, which illustrate a preferred embodiment, and wherein:

FIG. 1 is a view in elevation of the assembled noisemaker beacon;

FIG. 2 is a view of the assembled beacon with the casing removed.

Figure 3:
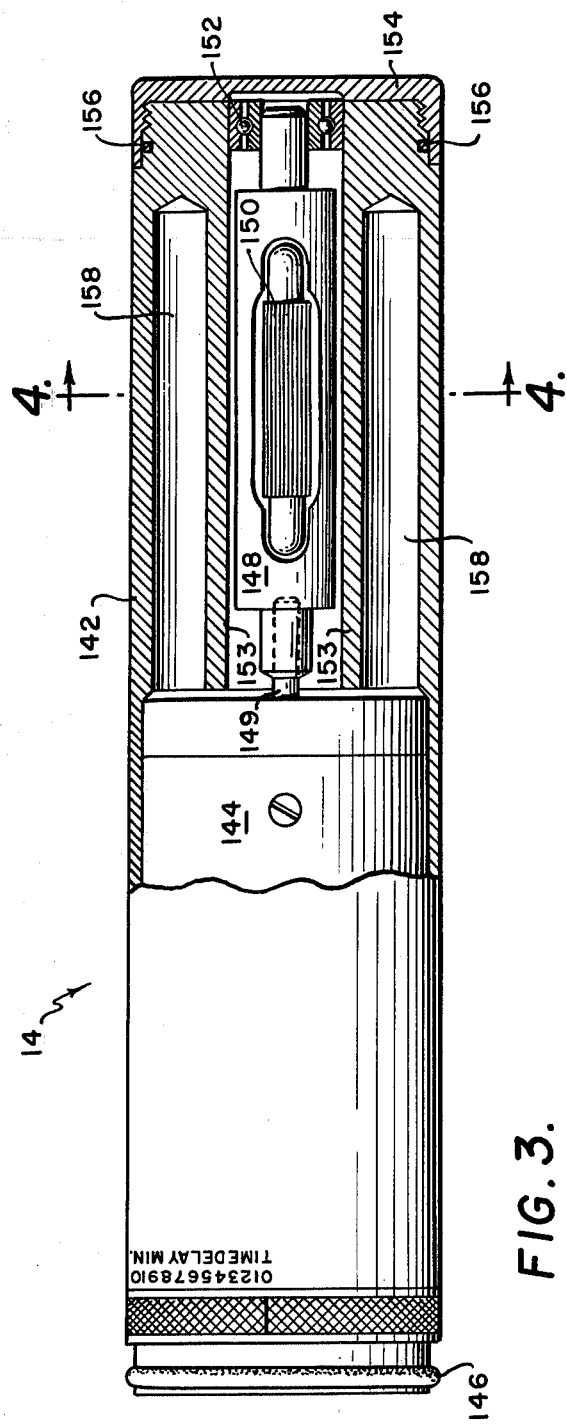
FIG. 3 is a view, partly in cross section, of the noisemaker of the beacon shown in FIGS. 1 and 2.

Referring now to the drawings, wherein like characters designate like or corresponding parts throughout the several views, there is shown in FIG. 1 an assembled noisemaker beacon indicated at 10 comprising a casing 12 having a noisemaker 14 at the lower end and a trigger assembly 16 at the other end.

In operation the noisemaker beacon is designed for launching from the signal tube of a submarine. The breech of the signal tube is opened and the beacon is inserted in the tube with the noisemaker 14 being inserted first and with the complete beacon being pushed forward in the tube so that there is a space of about eight inches at the rear of the noisemaker.

The breech of the signal tube is then closed and the outer end of the tube is opened to allow the tube to be flooded with water. A rubber diaphragm at the rear of the signal tube is then operated by air pressure which ejects the beacon from the submarine. The trigger mechanism 16 engages a catch as it leaves the signal tube which trips the trigger mechanism. After the trigger mechanism is tripped, a flotation device is ejected from the noisemaker casing 12, which flotation device is inflatable and raises the beacon up to about a depth of 20 feet below the surface of the water.

The noisemaker, which is set off by a timer, operates to generate a large amount of random noise which effectively jams any sonar or hydrophone systems in the area and interferes with the operation of any acoustic torpedoes.

As more clearly shown in FIG. 2, where the casing 12 is removed, the noisemaker 14 is shown having an insulated rod 18 for supporting a plurality of sea-cell batteries 20. These sea-cell batteries 20 are of the magnesium-silver chloride type, concentrically wound, and will operate in either fresh or salt water. Insulating spacers 22 are used at each end of and in between the batteries 20. Connections are indicated at 24 for electrical connections to a motor mounted in the noisemaker 14.

A spring ejector 26 rests on the end of the insulating rod 18 in order to expel flotation device 28 at the end of the casing. The flotation device 28 is mounted within a pair of half sleeves 30, which serve to compress the spring ejector 26 during assembly and also serve to force the trigger mechanism 16 and the flotation device 28 into the water after the trigger mechanism 16 is operated. Two split rings 32 serve to temporarily hold the two half sleeves 30 in place during the assembly of flotation device 28 when pushed into the casing 12.

A chemical canister 34 is attached to the bottom of the flotation 28 for supplying additional gas to an inflatable balloon 42. A nylon cord 36 is attached to the bottom of the chemical canister 34 and runs down through the spring ejector 26 where it is attached to the insulating rod 18. The nylon cord 36 is about 10 feet long with about 10" of it being disposed below the spring ejector 26 so that the cord may pass up through the spring ejector 26 as the ejector 26 expels flotation device 28 from the casing 12.

Figure 4:
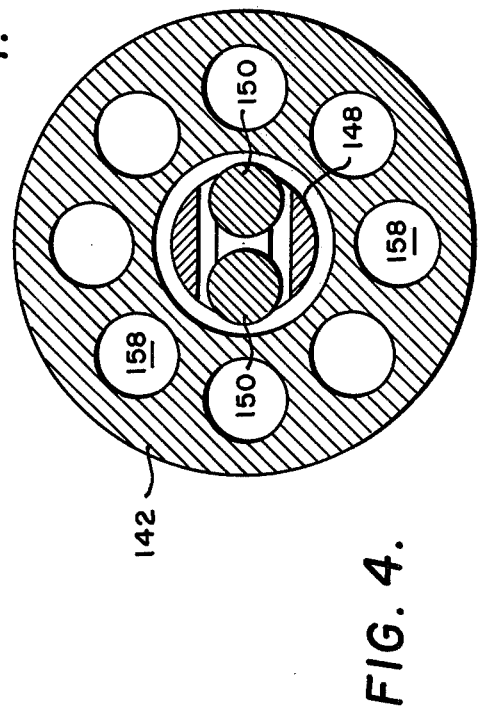
FIG. 4 is a cross sectional view of the noisemaker of FIG. 3 taken along line 4—4 looking in the direction of the arrows.

The noisemaker assembly 14 is shown in more detail in FIGS. 3 and 4 and consists primarily of a main housing 142 which is made of hardened aluminum. This housing 142 has continuous inner and outer cylindrical surfaces and serves as a generating structure for the noise waves and also serves as a housing for the motor 144 which drives the noisemaker. At the casing 12 end of the noisemaker is shown an O-ring seal 146 for sealing the casing 12 to the noisemaker 14, a plurality of roll pins (not shown) fasten the casing 12 to the noisemaker 14. A spindle 148 is shown attached to the shaft 149 of the motor 144 at one end and supported by a ball-bearing 152 at the other end. A pair of cylindrical rollers or hammers 150 having longitudinally cut V grooves are mounted within the spindle 148, which rotates the rollers 150, which, by centrifugal force, move out and strike the inner diameter 153 of the housing 142. A housing cap 154 is shown at the ball-bearing 152 end of the housing 142 and is sealed by an O-ring 156.

During the course of the development of this device it became important to have a fundamental frequency of about 20 Kc and to increase the high frequency output in the region from 20 to 90 kilocycles. This was successfully accomplished in the 20-60 kilocycle range by decreasing the inner diameter of the main housing 142 which resulted in a thick cylinder. However, it was further required to increase the output in the neighborhood of 60 to 90 kilocycles. A number of ideas were suggested, but the only successful one was by providing a plurality of longitudinal holes such as shown at 158 between the inner diameter 153 and the outer diameter of the main housing 142. The acoustic measurements as shown in FIG. 5 demonstrated the superiority of the hollow wall construction over that of other types.

Figure 5:
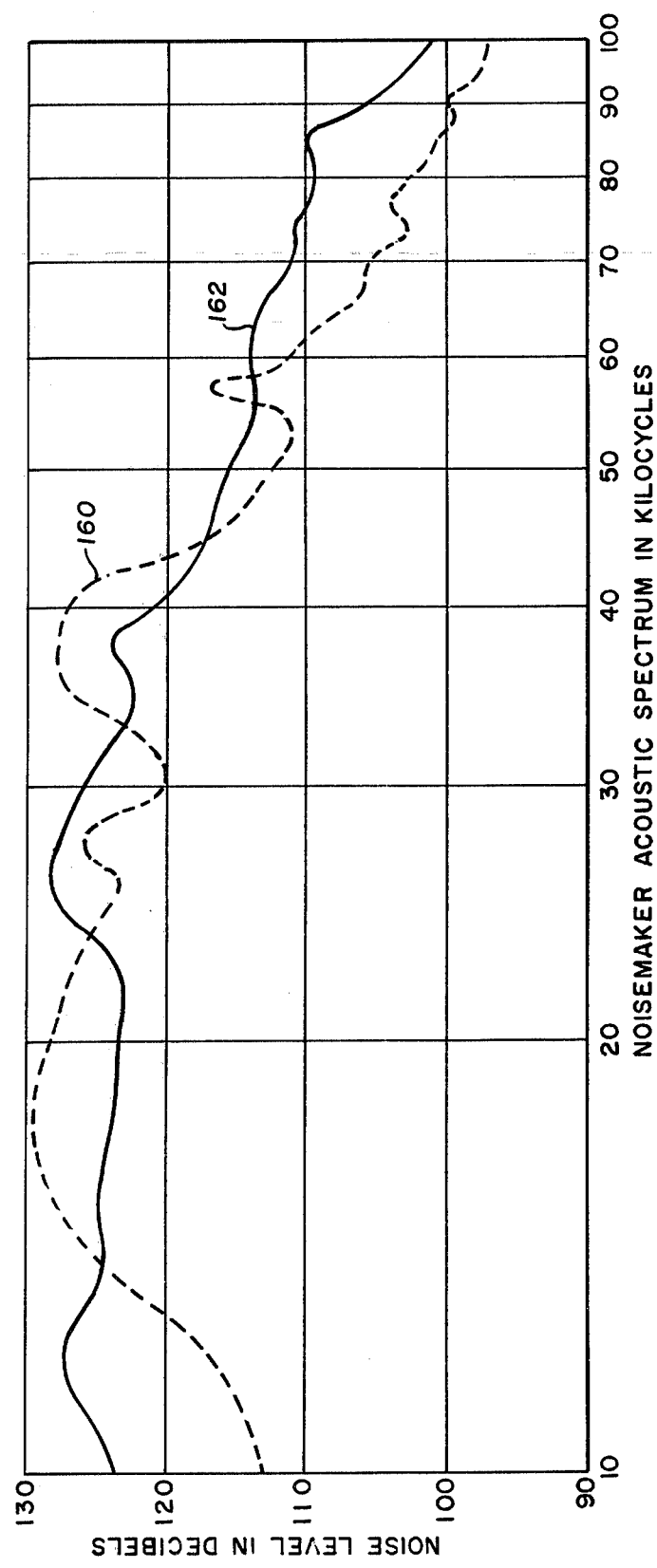
FIG. 5 is a graph of the outputs of the two types of noisemakers which are further described hereinafter.

In FIG. 5 the dotted line 160 corresponds to a noisemaker having a solid main housing, but having an inner diameter and an outer diameter equal to that shown in FIGS. 3 and 4. A solid line 162 is a curve of the output of the main housing 142 with the holes 158 as shown in FIGS. 3 and 4.

The ordinate of the curves of noise level in decibels, taken for a one cycle per second band width relative to a root mean square sound pressure of 0.0002 dynes per square centimeter. The abscissa of the curve is in kilocycles per second. An overall level of 164 db was measured for the solid cylinder and 166 db for the hollow wall cylinder.

No satisfactory theory is advanced for the superiority of this construction in the area from 60 to 90 kilocycles, but the results are as shown.

Obviously many modifications and variations of the present invention are possible in the light of the above teachings. It is therefore to be understood that within the scope of the appended claims the invention may be practiced otherwise than as specifically described.

What is claimed is:

1. An underwater noise generator comprising a thick walled cylindrical housing having a plurality of holes extending longitudinally therein; a spindle rotatably mounted within said cylinder along the longitudinal axis thereof, a plurality of hammers mounted on said spindle and driven thereby, and means for rotating said spindle whereby said hammers strike said cylindrical housing to thereby produce sound.

2. The invention as defined in claim 1 wherein ends are provided on said cylindrical housing and means are included for sealing said casing against water.

3. The invention as defined in claim 2 wherein said hammers are cylindrical in shape and have a plurality of grooves cut in the exterior surfaces thereof.

4. An underwater noise generator comprising a thick-walled hollow cylindrical housing, said housing having continuous inner and outer cylindrical surfaces and at least one hollow portion between said inner and outer surfaces; a spindle rotatably mounted within said housing along the longitudinal axis thereof, means for rotating said spindle, and a roller mounted on said spindle and driven thereby in rolling contact with said inner surface of said housing, said roller having a plurality of grooves cut in the exterior surface thereof, whereby sound is produced as said rollers roll on said cylindrical housing.

* * * * *